United States Patent [19]

Merges, Jr.

[11] 4,132,591

[45] Jan. 2, 1979

[54] MOLDING PROCESSES FOR MAKING MULTILAYER CONTAINERS OF DIFFERENT MATERIALS

[75] Inventor: John C. Merges, Jr., Glen Mills, Pa.

[73] Assignee: Sun Oil Company of Pennsylvania, Philadelphia, Pa.

[21] Appl. No.: 819,903

[22] Filed: Jul. 28, 1977

Related U.S. Application Data

[63] Continuation-in-part of Ser. No. 594,146, Jul. 7, 1975, abandoned.

[51] Int. Cl.$^2$ .............................................. D21F 11/00
[52] U.S. Cl. .................................. 162/146; 162/219; 162/224; 162/228; 264/87
[58] Field of Search ............... 162/123, 125, 130, 132, 162/129, 146, 157 R, 219, 224, 228, 396; 264/258, 301, 87

[56] References Cited

U.S. PATENT DOCUMENTS 3,205,123   9/1965   Hornbostel .......................... 162/219

3,594,273   7/1971   Williams ............................. 162/219

FOREIGN PATENT DOCUMENTS 73848   5/1973   Japan.
13848  10/1974   Japan.

*Primary Examiner*—Richard V. Fisher
*Assistant Examiner*—Peter Chin
*Attorney, Agent, or Firm*—J. Edward Hess; Donald R. Johnson; Anthony Potts, Jr.

[57] ABSTRACT

An improved method of pulp or pressure molding a multilayer container is disclosed wherein the inner layer consists of fused water dispersible polyolefin fibers whereas the outer layer consists of a mixture of cellulosic fibers bonded together by fused water dispersible polyolefin fibers. The containers are useful because the polyolefin layer is resistant to the passage of liquid such as lubricating oils and semi-solids such as greases while the mixed layer of cellulosic fibers and the polyolefin fiber supplies sufficient strength to permit the stacking of the containers when filled.

5 Claims, No Drawings

MOLDING PROCESSES FOR MAKING MULTILAYER CONTAINERS OF DIFFERENT MATERIALS

CROSS REFERENCE TO RELATED APPLICATION

This application is a continuation-in-part of U.S. patent application Ser. No. 594,146, filed July 7, 1975, now abandoned.

BACKGROUND OF THE INVENTION

Pulp molding and pressure molding are processes for making soft or hard molded products from cellulosic fibers and/or mixtures thereof. The soft molded products which generally contain just cellulosic fibers include egg trays, apple fruit trays, flower pots and other containers. The addition of plastics or other cementitious fibers to the cellulosic fibers permit the manufacture of hard molded products. Generally, the hardness is obtained by finishing the molded products in a hot press.

For example, Japanese application, Feb. 5, 1973, No. 48-13848, discloses a method for making containers of wood pulp and polyolefin. The method includes making a mixture consisting of a polyolefin (10 to 300 parts by weight) and of wood pulp (100 parts by weight) and then forming a vessel from the mixture and then heating the vessel to a temperature above the melting point of the polyolefin.

However, applicant has found, as discussed in detail in Comparative Examples, that a single layer of a fused mixture of polyolefin and wood pulp does not result in a liquid resistant layer.

Generally, a pulp molding process involves the use of a male forming die covered with a wire mesh. The die passes through a stock chest holding a liquid suspension and the required thickness of solids is accreted on the forming surface. Liquid passing through the die is drawn off by a vacuum. Generally the liquid is water. The formed solid layer is removed from the forming die by various means.

The aforementioned male die can be a perforated rigid metal or plastic form, covered on the forming face with a fine wire screen and enclosed at the back to form a vacuum chamber. Thus, during the forming, water containing solids is drawn through the wire mesh where the solids are deposited, and flows into the vacuum chamber where it is drained off.

To separate most of the water from the shaped layer of solids, a press die is often used. A press die comprises a soft rubber or plastic bag which is fitted over the soft and wet shape. The bag is inflated to press, dewater and at the same time make the surface it contacts smoother.

To remove the dewatered, shaped layer from the forming die, a female transfer die can be used. The transfer die can be perforated rigid metal or plastic form which shape approximates the shape of the forming die. The transfer die is connected to both a vacuum and compressed air supply. During the transfer operation the perforated die is fitted over the pressed shape. While the die and the pressed wet shape are in close contact, vacuum is applied to the transfer die and compressed air is applied to the inside of the forming die. The pressed shape is thus taken off the forming die. The transfer die carries the pressed shape generally to an oven or some similar heating system where the pressed shape is blown off the die by a gentle blast of compressed air. After the article passes through the oven it emerges as a finished product.

A pressure molding process is described in the section titled Description.

However, there is a problem associated with making inexpensive, liquid holding containers of cellulosic fibers and polyolefin fibers. If not enough polyolefin fiber is used, some cellulosic fibers are not encapsulated and too much of the contained liquid wicks through to the outside surface making the container unsatisfactory. To avoid the foregoing the amount of polyolefin fiber used in the mixture is increased but then the cost of the container increases. The latter occurs because generally the cellulosic fibers are less expensive then the polyolefin fibers. Thus, the function of the cellulosic fiber is to minimize the cost of the container whereas the function of the polyolefin fiber is to make the container resistant to liquids. Applicant's invention overcomes the foregoing problem.

Also, oil containers, which are internally polyethylene coated, can be formed by spiral winding of polyethylene coated cellulosic stock. This stock is made by extrusion coating. Containers prepared by spiral winding can have leakage at the seams of the metal closures as well as the seams of the spiral wind. To compensate for such leakage the current practice is to add additional liquid to allow for wicking at the seams and thereby meet weight and measure test procedures. Applicant's invention overcomes this problem because of the reduction in the amount of seams while maintaining an impervious inner coating.

SUMMARY OF THE INVENTION

Present invention provides a simple method for forming a multilayer container. The method involves forming at least one inner shaped layer of water dispersible polyolefin fibers and juxtapose to it at least one other layer of a mixture of cellulosic fibers and water-dispersible polyolefin fibers. The method further involves subjecting the formed, multilayer article to sufficient heat and pressure to fuse the polyolefin fiber layer so that it is a barrier to a hydrocarbon liquid, or semi-solids such as fats and greases. Also, the heat and pressure fuses the polyolefin of the cellulosic layer so that the resulting fused material supports the polyolefin fiber layer and also fuses or bonds the two layers together via the polyolefin contained in each layer.

DESCRIPTION

The following describes the peparation of a two-layer container having utility as an oil can. As explained hereinafter this is a particular description of the applicant's method; variations can be used. Among the variations are included making three, four, etc., layer containers.

To prepare a two-layer oil can, two different stock chests are used, rather than one which is normally used in pulp molding. One stock chest holds a liquid suspension of water-dispersible polyolefin fibers wherein for example, the polyolefin is a high density polyethylene. The other stock chest holds a liquid suspension of a mixture of cellulosic fibers and water dispersible polyolefin fibers wherein for example, the polyolefin is a high density polyetheylene.

A perforated, rigid metal forming male die, covered on its forming face with a fine wire screen and enclosed at the back to form a vacuum chamber is placed in the tank holding the water dispersible polyolefin fibers. The application of the vacuum causes the water suspension to go to the outer surface of the forming die and while the solid fiber deposits on the surface, the water passes through the wire mesh into the vacuum chamber. After sufficient water has been drawn to obtain the required thickness, the die is removed from the stock chest. The water in the chamber is drawn out.

The amount of the polyolefin fibers on the forming die is sufficient so as to form a liquid barrier when fused, and in this particular description, sufficient to resist the penetration of a hydrocarbon oil. To provide the necessary resistance the weight of the polyolefin layer compared to the total weight of the container is at least about 16%. This minimum weight requirement is discussed in more detail in the Examples. However, if too much polyolefin is used then the cost of the finished container becomes excessive. In addition if too much polyolefin is used the production rate of the number of containers per unit of time is reduced because of the additional time required to deposit more of the polyolefin. Also too much polyolfin can cause heat transfer problems when heating treating the final container.

Next the coated forming die is placed in the stock chest holding the mixture of cellulosic fibers and water dispersible polyolefin fibers. Again the application of the vacuum causes the water suspension to form a solid fiber mixture layer on the already formed layer and the water passes through the wire mesh into the vacuum chamber. When sufficient water has been drawn to obtain the required weight the die is removed from the stock chest and the water in the chamber is drawn out.

The amount of the mixture deposited upon the polyolefin layer is sufficient to provide at least the necessary strength so that the filled containers can be stacked atop each other without crushing. As to the mixture it should contain sufficient polyolefin so as to insure adequate bonding of the cellulosic fibers in the outer layer as well as providing bonding of the outer layer to the inner layer. Generally, the mixture will contain from between about 90% to about 10% by weight of said polyolefin fibers, a preferred range is between about 80% to about 20% and a more preferred range is between about 50% to about 20%.

The article can be removed from the forming die by various means. One example of such means is a transfer die. This die is a perforated, rigid metal form which shape approximates the final dimensions of the desired container. The transfer die is connected to both vacuum and compressed air lines. The transfer die is placed over the article on the forming die and while contacting the article a vacuum is applied to the transfer die and compressed air is applied to the inside of the forming die. Thus, the article is taken off the forming die which is reused in the process.

The female transfer die containing the two layered, wet shaped article is subjected to pressure by various means to eliminate the water retained by the fiber. One example of the means to do this is a press die. The press die, comprising a soft rubber bag, is fitted into the two layered article. The bag is inflated and the inflation causes the rubber to press against the article forcing out the water. While doing this, the press die also causes the surfaces of the article to become smooth and assume the dimensions of the transfer die.

Before heating the article to above the fusion point of the polyolefin all traces of excess water must be removed. If water is present during the heating step the article will delaminate.

In the heating step it is preferred that the article be subjected to pressure to maintain more closely the dimensions of the desired shape as well as provide more finished surfaces. Upon cooling the container can be decorated in some fashion, filled and then a lid can be attached to the container and sealed by various means.

One example of the heating step would be that the forming die and the transfer die could be used to subject the article to pressure while both dies and the article were heated to a tempeature sufficient to cause the polyolefin fibers to fuse together.

While the foregoing process is preferred because the weight of material deposited in each layer can be more accurately controlled to give optimum properties with minimum cost, other means can be used to prepare an oil container, for example, by present invention. This involves pressure molding. Here a female wet forming die uses a perforated metal form with an interior forming face. This face is covered with wire screen or a finely perforated sheet and the outer face of the rigid form is enclosed in a drainage chamber. A water suspension of the mixture of cellulosic fiber and water dispersible polyolefin fiber is placed under pressure to the interior forming face while the water passes through to the outer drainage box. After the required thickness of the mixture has accumulated the water suspension flow is stopped. Compressed air can be blown through the accumulated material to compress it and to dewater it.

A second water suspension of water dispersible polyolefin fibers is placed under pressure to the layer of the mixture formed in the interior forming face of the die. Again while water passes through the first formed layer and die to the outer drainage box, the polyolefin fibers build up until the required thickness is obtained. Then the water suspension flow is stopped and compressed air can be blown through the accumulated material to compress both layers and dewater them.

An external rubber bag, designed to fit inside the wet product already formed in the mold, is placed next to the formed layers. After proper placement the bag is inflated to further compress and dewater the article. Another suitably dimensioned and shaped male removal die can be placed inside the article and compressed air applied to the exterior of the forming mold so that the product is retained on the removal die which is then taken out of the forming die. On the removal die the container can be pressed by another die which fits over the removal die and the article thereon. Again the resulting article is heated to a suitable temperature under pressure in various ways so that the polyolefin fuses sufficiently to bond the two layers and the cellulosic fibers into a final dimension and form a barrier to oil. Upon cooling the container can be decorated in some fashion, filled and then a lid can be attached to the container and sealed by various means.

Water dispersible polyolefin fibers and their preparation are known. These fibers have been so treated that they are dispersible in water even though their specific gravity is less than one. Polyolfins having a specific gravities of less than one and which can be used are as follows: low density polyethylene, medium density polyethylene, high density polyethiylene, crystalline polypropylene, poly-1-butene, and poly-4-1-pentene.

Containers formed by present invention can be used to hold many different kinds of liquid, such as hydrocarbon liquids, lubricating oils, rubber oils, wax emulsions, solids such as fats and greases, aqueous solutions and aqueous suspensions.

EXAMPLES

Test sheets of water dispersible high density polyethylene fibers and mixtures of cellulosic fiber and water dispersible high density polyethylene fibers were prepared according to procedure given in TAPPI's T-200M and T-205M. (TAPPI = Technical Association of Pulp and Paper Industry). Then wet sheets of water dispersible polyethylene fibers were placed next to wet sheets of the mixture. The combined sheets were pressed together over a blotter and a wired sheet. The pressed sheets were then placed in drying rings and allowed to dry. When the combined sheets were dry the excess outside the drying rings was trimmed off. The trimmed combined sheets were placed between teflon sheets and pressured in a hydraulic press maintained at 300° F and 2500 psig for three minutes.

Following the foregoing procedure, sheets of various materials and weights per area were prepared and various combinations tested as to oil resistance. To test oil resistance the sheets were cut into discs of about two inches in diameter and placed in a metal Millipore pressure filter apparatus and exposed to a 10W40 automotive lubricating oil at various temperatures. The surface exposed to the oil was the high density polyethylene layer.

A combined sheet was prepared wherein the high density polyethylene layer amounted to 25% of the total weight of the sheet. The mixture layer consisted of 80% by weight of cellulosic pulp and 20% by weight of the polyethylene and measured 360 grams per square meter. One disc of this sheet was exposed to 10W40 oil for 19 days at room temperature. Its weight increased by 2.53% which can be considered satisfactory. No oil stain was visible on the back side of the disc. Another disc was exposed to 10W40 oil for 19 days at 205° F. Its weight increased by 4.13% which again can be considered satisfactory. No oil stain was visible on the back side of the disc.

A second combined sheet was prepared wherein the high density polyethylene layer amounted to 20% of the total weight of the sheet. A disc of this combined sheet was exposed to 10W40 oil for 14 days at 205° F. Its weight increased by 3.34%. No oil stain was visible on the back side of the disc.

A third combined sheet was prepared wherein the high density polyethylene layer amounted to 15% of the total weight of the sheet. A disc of this combined sheet was exposed to 10W40 oil for 13 days at 205° F. Its weight increased by some 39.5%, which was unsatisfactory. An oil stain was clearly visible on the back side of the disc.

The following Table summarizes the foregoing results:

TABLE

| Weight of the Polyethylene Layer as % of Total Weight of the Sheet | % Increase in Weight at Various Temperatures | Oil Stain Visible |
|---|---|---|
| 25 | 2.53 to 4.13 | No |
| 20 | 3.34 | No |
| 15 | 39.5 | Yes |

Thus the foregoing indicates that where the weight of polyethylene layer compared to the total weight of combined layers was 15%, the amount of polyethylene in the inner layer was not sufficient to seal the surface of the sheet and prevent penetration by the oil.

Use of polyolefins such as low density polyethylene, medium density polyethylene, crystalline polypropylene, poly-1-butene and poly-4-methyl-1-pentene will achieve analogous results. Also the polyolefin of the mixture of cellulosic fiber and polyolefin can be different than that of the polyolefin of the polyolefin layer; as an example the mixture could contain crystalline polypropylene whereas the other layer could contain low-density polyethylene.

A two-layer oil can, based on the foregoing compositions and results is prepared in the following manner. One stock chest, hereinafter referred to as the first chest, is filled with a water suspension of water dispersible high density polyethylene fibers. Another stock chest, hereinafter referred to as the second chest, is filled with a water mixture of water dispersible high density polyethylene fibers and cellulosic fibers. The polyethylene fibers in the second chest amounts to 20 weight percent of the dry mixtures.

A perforated, rigid metal forming male die, covered on its forming face with a fine wire screen and enclosed at its back to form a vacuum chamber is placed in the first stock chest. A vacuum is applied to the male die causing the water suspension to go the the outer surface of the male die. While the solid polyethyelene fibers deposit on the surface of the die the water passes through the wire mesh and the forming fibers into a vacuum chamber. After an amount which is equal to 20°% of the total weight of the container of the polyethylene fibers is deposited on the male die, the die is removed from the stock chest. The die now contains a shaped layer of polyolefin fibers.

Next, the male die, which is coated with the polyethylene fibers, is placed in the second chest. A vacuum is applied to the male die causing a deposit of the mixture juxtaposed to polyethylene fiber layer while the water passes through the wire mesh into a vacuum chamber. The amount of water drawn is such that the weight of the mixture layer amounts to 80 weight percent of the resulting container. The male die is then removed from the second chest and now contains an inner shaped layer of polyolefin fibers and an outer shaped layer of a mixture of polyolefin fibers and cellulosic fibers.

In this example the formed shaped bi-layer article is removed by hand from the male die. However, it can be removed mechanically as described heretofore under Description.

The formed shaped bi-layer article is hand placed into a similar shaped female die. This female die is constructed of a finely mesh screen. A slightly smaller similar shaped male die is inserted in the bi-layer article contained in the female die and pressure is applied to the male die. Any remaining excess water is forced out of the bi-layer material through the screen.

After pressing the excess water from the article the male die is removed and the pressed article is removed from the female die. Then it is placed in a male die having a smooth solid surface and which dimensions are those of desired finished container. The cobmination of male die and unfinished container are placed in a female die having a smooth solid surface. The dies, while under pressure, are heated to a temperature above the fusion point of the polyethylene. The dies are kept together for a sufficient time to allow fusion of the polyethylene. Afterward the dies are separated and allowed to cool. After sufficient time has lapsed the cooled, fused bilayer container is removed from the die.

COMPARATIVE EXAMPLES

Samples of a fused, pressed sheet composed of just 80% by weight of cellulosic pulp and 20% by weight of polyethylene was also tested in a Millipore apparatus. The following Table summarizes the unsatisfactory results obtained when one surface of the sample was exposed to several different fluids.

TABLE

| Test Fluid | % Increase in Weight at 200° F | Visible Stain |
|---|---|---|
| Water | 21 | Yes |
| ATF* Fluid | 14 | Yes |
| SAE 10 Oil | 10 | Yes |
| 10W40 Oil | 16 | Yes |

*ATF = Automatic Transmission Fluid

The foregoing results indicate the need for a protective inner liner.

The invention claimed is:

1. A pulp molding process for making a multilayer container comprising:
   (a) forming at least one shaped inner layer consisting of water dispersible polyolefin fibers from a water slurry of said fibers on a container forming means wherein the amount of the fibers is in the range of about 16 weight % to about 50 weight % of the total weight of resulting container;
   (b) forming juxtaposed to the inner shaped layer at least one outer layer of a mixture of cellulosic fibers and polyolefin fibers form a water slurry of said mixture of fibers wherein the amount of the fibers in the mixture is in the range of about 10 weight % to about 90 weight %;
   (c) removing resulting multilayer formed shape container from the forming means and removing any remaining water contained in the multilayer formed shape container; and
   (d) subjecting the removed multilayer formed shape container to sufficient heat and pressure to fuse the polyolefin fibers of the inner layer into a liquid barrier and to fuse the polyolefin fibers of the cellulosic layer to the inner layer.

2. Process according to claim 1 wherein the polyolefin is selected from the group consisting of low density polyethylene, medium density polyethylene, high density polyethylene, crystalline polypropylene, poly-1-butene and poly-4-methyl-1-pentene.

3. Process according to claim 1 wherein only two layers are formed.

4. Process according to claim 3 wherein the polyolefin is selected from the group consisting of low density polyethylene, medium density polyethylene, high density polyethylene, crystalline polypropylene, poly-1-butene and poly-4-methyl-1-pentene.

5. Process according to claim 4 wherein the amount of fibers in the mixture is in the range of about 20% to about 50%.

* * * * *